United States Patent
Lessi et al.

(10) Patent No.: US 6,955,710 B2
(45) Date of Patent: Oct. 18, 2005

(54) ON-BOARD OXYGEN PRODUCTION SYSTEM FOR AIRCRAFT, IN PARTICULAR LONG-RANGE AIRCRAFT

(75) Inventors: Stéphane Lessi, Grenoble (FR); Richard Zapata, Sassenage (FR); Jean-Michel Cazenave, Grenoble (FR); Jean Dehayes, Lumblin (FR)

(73) Assignee: L'Air Liquide, Societe Anonyme pour l'Etude et, l 'Exploitation des Procedes Georges Claude, Paris (FR)

( * ) Notice: Subject to any disclaimer, the term of this patent is extended or adjusted under 35 U.S.C. 154(b) by 10 days.

(21) Appl. No.: 10/427,461

(22) Filed: May 1, 2003

(65) Prior Publication Data

US 2003/0205132 A1 Nov. 6, 2003

(30) Foreign Application Priority Data

May 3, 2002 (FR) ............................................ 02 05576

(51) Int. Cl.$^7$ .......................................... B01D 53/047
(52) U.S. Cl. .............................. 95/96; 95/101; 95/102; 95/103; 95/105; 95/130; 95/902; 96/130; 96/143; 128/204.18; 128/204.29
(58) Field of Search ............................ 95/96–105, 130, 95/902; 96/130, 133, 135, 142–144; 128/204.18, 204.29

(56) References Cited

U.S. PATENT DOCUMENTS

| | | | | |
|---|---|---|---|---|
| 3,922,149 A | * | 11/1975 | Ruder et al. ................... 95/22 |
| 3,923,477 A | * | 12/1975 | Armond et al. ................ 95/103 |
| 4,065,272 A | * | 12/1977 | Armond ......................... 95/101 |
| 4,404,005 A | * | 9/1983 | Hamlin et al. ................. 96/111 |
| 4,428,372 A | | 1/1984 | Beysel et al. .......... 128/202.26 |
| 4,455,861 A | * | 6/1984 | Alftine ....................... 73/31.04 |
| 4,651,728 A | * | 3/1987 | Gupta et al. ........... 128/201.28 |
| 4,681,602 A | * | 7/1987 | Glenn et al. ................... 95/47 |
| 4,687,013 A | * | 8/1987 | Stevenson ...................... 137/7 |
| 4,687,573 A | * | 8/1987 | Miller et al. ................. 210/143 |
| 4,737,170 A | * | 4/1988 | Searle ........................ 96/130 |
| 4,783,205 A | * | 11/1988 | Searle ........................ 96/111 |
| 4,859,217 A | * | 8/1989 | Chao ........................... 95/130 |
| 4,950,311 A | * | 8/1990 | White, Jr. ..................... 95/98 |
| 4,960,119 A | * | 10/1990 | Hamlin ................... 128/204.18 |
| 5,199,423 A | * | 4/1993 | Harral et al. .......... 128/202.26 |
| 5,268,023 A | | 12/1993 | Kirner ......................... 95/103 |
| 5,429,663 A | * | 7/1995 | Cassidy et al. ................ 95/21 |
| 5,464,467 A | * | 11/1995 | Fitch et al. .................... 95/98 |
| 5,531,220 A | * | 7/1996 | Cassidy ................. 128/204.29 |
| 5,531,807 A | * | 7/1996 | McCombs ..................... 95/26 |
| 5,549,736 A | * | 8/1996 | Coffield et al. ............... 96/133 |
| 5,658,370 A | * | 8/1997 | Vigor et al. ................... 95/96 |
| 5,672,195 A | | 9/1997 | Moreau et al. ................ 95/96 |
| 5,858,063 A | * | 1/1999 | Cao et al. ...................... 95/11 |
| 6,063,169 A | * | 5/2000 | Cramer et al. ............... 96/112 |
| 6,068,678 A | | 5/2000 | Labasque et al. .............. 95/96 |
| 6,077,331 A | | 6/2000 | Phillips ........................ 95/12 |
| 6,261,344 B1 | * | 7/2001 | Labasque et al. ............. 95/96 |
| 6,319,305 B1 | * | 11/2001 | Phillips et al. .................. 96/4 |
| 6,551,384 B1 | * | 4/2003 | Ackley et al. ................. 95/96 |
| 6,701,923 B2 | * | 3/2004 | Cazenave et al. ...... 128/204.22 |
| 6,739,400 B2 | * | 5/2004 | Lessi et al. ................... 169/46 |
| 2002/0017191 A1 | * | 2/2002 | Maheshwary et al. ......... 95/96 |
| 2002/0108494 A1 | * | 8/2002 | Sircar et al. ................... 95/96 |

FOREIGN PATENT DOCUMENTS

| | | | |
|---|---|---|---|
| EP | 0297542 A2 | * | 1/1989 |
| EP | 0364283 A2 | * | 4/1990 |
| EP | 0391607 A2 | * | 10/1990 |
| EP | 0885646 A1 | * | 12/1998 |
| EP | 0908218 A1 | * | 4/1999 |
| EP | 0940175 A1 | * | 9/1999 |
| GB | 2013101 A | * | 8/1979 |

OTHER PUBLICATIONS

French Search Report to FR 02 05576.

* cited by examiner

Primary Examiner—Robert H. Spitzer
(74) Attorney, Agent, or Firm—Linda K. Russell

(57) ABSTRACT

Method and system on board an aircraft for the production of an oxygen-enriched gas stream from an oxygen/nitrogen gas mixture, particularly air, comprising at least one adsorber containing at least one adsorbent for adsorbing at least some of the nitrogen molecules contained in the oxygen/nitrogen feed mixture, characterized in that the adsorbent comprises a faujasite-type zeolite, having a Si/Al ratio of 1 to 1.50, exchanged to at least 80% with lithium cations. Aircraft equipped with such a system, in particular an airliner, especially an airliner of the long-range, large-capacity type.

30 Claims, 2 Drawing Sheets

# ON-BOARD OXYGEN PRODUCTION SYSTEM FOR AIRCRAFT, IN PARTICULAR LONG-RANGE AIRCRAFT

BACKGROUND OF THE INVENTION

1. Field of the Invention

The present invention relates to an oxygen concentration system, especially of the OBOGS type, for aircraft, in particular for long-range, large-capacity airliners.

2. Related Art

At the present time, gaseous oxygen is used by the pilots and passengers of a civil commercial airliner in the event of cabin decompression (passengers and pilots), in the event of protection against smoke and toxic gases (pilots) and in the event of prior protection when cruising at high altitude (pilots).

Moreover, the pilots of military aircraft have need for a permanent oxygen supply, throughout their flight missions. In certain specific missions, the same applies to the crew of military tactical transport planes and helicopters.

The constraints imposed by the aeronautical environment mean equipment must be designed to be as light as possible and capable of providing the largest quantity of oxygen possible, with substantial self-sufficiency, and consequently the least possible logistics.

In modern fighter planes, the pilot or pilots are permanently supplied by an on-board oxygen generating system (commonly abbreviated to OBOGS), using the technology for separating gases from the air by a zeolite-type molecular sieve.

Document EP-A-391 607 thus discloses an OBOGS-type oxygen concentration system that can be used for supplying the crew members of an aircraft using an adsorbent of the molecular sieve type.

Furthermore, document U.S. Pat. No. 4,960,119 also teaches an OBOGS-type system using adsorbents that have a higher affinity for nitrogen than for oxygen.

Moreover, other OBOGS-type systems are also disclosed by documents U.S. Pat. No. 4,651,728 and EP-A-0 364 283.

On the other hand, in civil aircraft, the total supply of gaseous oxygen to the people on board is provided by pressurized oxygen cylinders or by chemical oxygen generators, for example on the AIRBUS A340 (tank of oxygen in gaseous form) and AIRBUS A320 (chemical generator). These civil oxygen production systems are currently designed and sized so as to deliver oxygen to the passengers for a period varying from 15 to 22 minutes, essentially following a loss of cabin pressure.

As in the case of military aircraft, it is now envisaged to also equip new airliners, especially long-range, large-capacity airliners, for example the AIRBUS A380-type planes, as well as business planes, with on-board systems of the OBOGS type based on an adsorbent molecular sieve.

This is because, compared with oxygen storage, molecular-sieve OBOGS-type systems have the advantages:

- of a weight saving when the time they are in use typically exceeds 30 min, as is the case with the planned diverting of aircraft to the new longer-haul air routes;
- of reduced logistics;
- of greater safety and availability; and
- of unlimited self-sufficiency.

These same advantages also exist when the OBOGS system is on board a military tactical transport plane or a helicopter, when these have to carry out missions requiring the use of oxygen.

However, one problem that arises is that the existing OBOGS-type systems are much heavier than conventional on-board oxygen storage systems, and this constitutes a serious impediment to their use in aircraft in which the reduction in on-board weight is a constant concern, as it has a not insignificant impact on fuel consumption.

In other words, the problem that arises is to be able to fit molecular-sieve OBOGS-type systems on board aircraft without this having a negative impact on the on-board weight, and to achieve this with substantially the same, or even greater, oxygen production compared with a conventional system.

SUMMARY OF THE INVENTION

The solution of the invention is therefore a system fitted on board an aircraft for the production of an oxygen-enriched gas stream from an oxygen/nitrogen gas mixture, particularly air, comprising at least one adsorber containing at least one adsorbent for adsorbing at least some of the nitrogen molecules contained in the oxygen/nitrogen feed mixture, characterized in that the adsorbent comprises a faujasite-type zeolite, having an Si/Al ratio of 1 to 1.50, exchanged to at least 80% with lithium cations.

BRIEF DESCRIPTION OF THE DRAWINGS

For a further understanding of the nature and objects tar the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
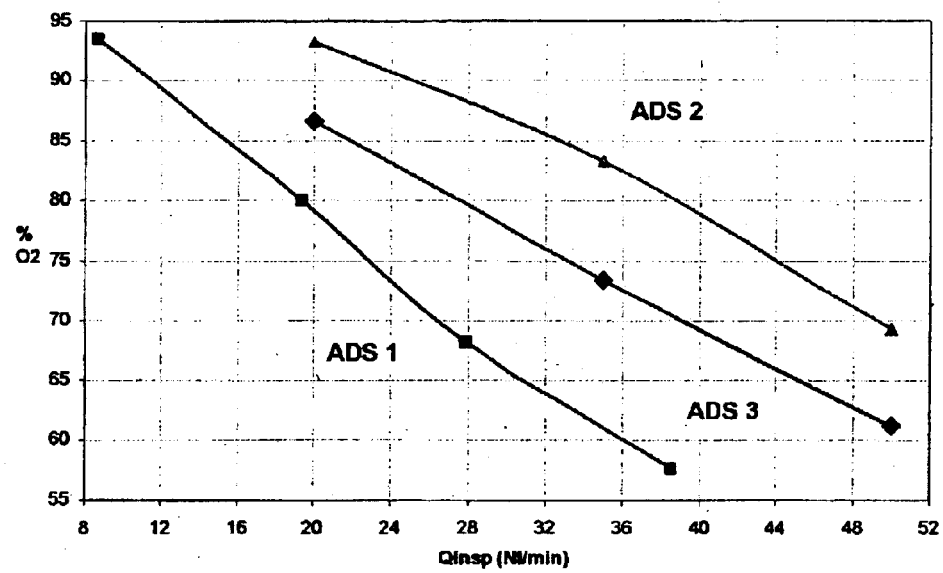
FIG. 1 is a graph illustrating the oxygen concentration (% purity) as a function of small-scale production output for two adsorbents of the invention and one adsorbent of the prior art.

Depending on the case, the system of the invention may include one or more of the following technical features:

- it comprises at least two adsorbers operating alternately;
- the adsorbent is an X-type zeolite having an Si/Al ratio of 1 to 1.25, preferably about 1;
- the zeolite is in the form of particles, especially beads, having a mean size of less than 0.7 mm, preferably about 0.5 mm. The zeolite particles may be with or without a binder;
- the zeolite is exchanged by 85 to 97%, preferably 86 to 95%, with lithium cations;
- it comprises compression means for compressing the gas mixture containing oxygen and nitrogen, for example a gas compressor, and distribution means for ensuring that each adsorber is fed alternately with the compressed gas mixture delivered by the compression means. The distribution means may comprise gas lines, valves, masks or any other suitable control interfaces or equipment for easy and effective administration of the oxygen stream to the users.

The system of the invention may be fitted in any aircraft, such as planes or helicopters, but it is particularly suitable for airliners, especially the new long-range, large-capacity airliners.

The invention also relates to a method for supplying the upper airways of at least one person in an aircraft with an oxygen-enriched gas stream, in which the oxygen-enriched stream is produced according to the following steps:

a) an oxygen/nitrogen feed mixture is compressed to a pressure of between 0.5 and 5 bar absolute, b) at least one adsorber containing at least one adsorbent, for adsorbing at least some of the nitrogen molecules contained in the oxygen/nitrogen feed mixture, is fed, c) an oxygen-enriched gas stream is produced, and d) said oxygen-enriched gas stream is conveyed right to the upper airways of at least one person, characterized in that the adsorbent comprises a faujasite-type zeolite, having an Si/Al ratio of 1 to 1.50, exchanged to at least 80% with lithium cations.

Depending on the case, the method of the invention may include one or more of the following technical features:

the oxygen-enriched stream has an oxygen content higher than the oxygen content of the oxygen/nitrogen feed mixture and preferably the oxygen-enriched system has an oxygen volume content of between 30 and 95% by volume;

the oxygen/nitrogen feed mixture contains predominantly nitrogen, the oxygen/nitrogen feed mixture preferably being air;

it furthermore includes a step of regenerating the adsorbent by reducing the pressure in the adsorber down to a low pressure of between 0.09 and 1 bar, preferably between 0.1 and 0.9 bar, the regeneration low pressure being lower than the adsorption high pressure;

it uses two or three adsorbers operating per production cycle;

each adsorber undergoes production cycles having a cycle time of less than 15 seconds (for example a 2×7 s cycle for two adsorbers), preferably less than 10 s (for example a 2×5 s cycle for two adsorbers);

the adsorbent is an X-type zeolite having an Si/Al ratio of 1 to 1.25, preferably about 1;

the zeolite is in the form of particles, especially beads, having a mean size of less than 0.7 mm, preferably about 0.5 mm;

the zeolite is exchanged by 85 to 97%, preferably 86 to 95%, with lithium cations;

the oxygen-enriched gas thus produced is distributed to the upper airways of at least one pilot or of at least one passenger in the aircraft, preferably the oxygen-enriched gas thus produced is distributed to the upper airways of at least one passenger when the plane suffers depressurization of the passenger cabin.

The idea of the present invention is to reduce the weight of on-board systems of the OBOGS type for civil planes, military planes and other aircraft, including helicopters, using higher-performance adsorbent molecular sieves.

This is because the use of the adsorbents according to the invention makes it possible to obtain:

either, for the same mass of adsorbent and the same production rate, an increase in the oxygen concentration, or in the ability to enrich with oxygen, in the gas produced, hence resulting in improved physiological protection of the passengers or pilots, and an extension of the lifetime of the equipment, as a result of the drop in oxygen concentration in the gas produced below a certain threshold, starting from a higher initial oxygen concentration;

or, for the same oxygen concentration in the gas produced and the same production rate, and therefore the same performance, a reduction in the mass of adsorbent needed, and therefore a reduction in the weight of the on-board equipment, hence a substantial saving for the airframe manufacturer.

Within the context of the invention, the preferred adsorbent used is therefore an X-type zeolite having an Si/Al ratio of between 1 and 1.25 and exchanged to more than 80% with lithium cations (up to 100%) being essentially residual cations of the Na and K, or possibly Ca, type. Such adsorbents are normally used to produce oxygen on industrial sites and have been described, for example, in the following documents, to which reference may be made for further details: EP-A-885 646, EP-A-940 175, EP-A-908 218, EP-A-297 542 and U.S. Pat. No. 5,268,023.

The system proposed within the context of the present invention is therefore, according to a preferred embodiment, an OBOGS system of the VPSA (Vacuum and Pressure Swing Adsorption) type having two adsorbers operating alternately at a rapid rate, typically with oxygen production cycles with a cycle time of less than 2×7 s (7 s being the half-cycle time) and possibly down to 2×2 s, thereby ensuring maximum and optimum productivity (quantity of oxygen produced/mass of adsorbent).

This system may also operate with more adsorbers, for example three adsorbers.

When one of the two adsorbers is in the high-pressure oxygen production phase, the other one is in the low-pressure regeneration (decompression) phase.

More specifically, each adsorber is subjected, during the production cycle, to:

a high pressure, typically between 0.5 bar abs and 5 bar abs, preferably about 3 bar in the case of civil planes; and a low pressure, typically between 1013 mbar (ground) and 116 mbar (50 000 ft), preferably about 466 mbar (20 000 ft)

To be able to meet the expectations, the oxygen production rate characteristics of each concentrator are the following:

for supplying oxygen to the pilots (for example those of military planes and airliners) or to a smaller crew (other aircraft), the output of oxygen-enriched gas is preferably between 20 and 100 l/min STPD (Standard Temperature Pressure Dry: temperature=0° C.; pressure=1013 mbar, $P_{H_2O}=0$);

for supplying oxygen to the passengers, the output is higher, mainly in general between 100 and 500 l/min STPD per concentrator system. Above this, when it becomes necessary to have a higher total output, all that is required is to provide a sufficient number of concentrator systems enabling this total output to be achieved, for example four concentrator systems each of 500 l/min for a total output of 2000 l/min.

The oxygen concentration of the gas output by the concentrators varies with the altitude of flight and is typically between 30 and 95% in all the cases envisaged, namely the supply of oxygen to pilots and to passengers, whatever the aircraft in question.

The type of adsorbent used within the context of the invention is a faujasite-type zeolite, in particular an X zeolite having an Si/Al ratio of between 1 and 1.50, preferably close to 1, said zeolite being exchanged to at least 80%, preferably between 85 and 97%, with lithium cations, and also having a mean particle size of less than 0.8 mm, preferably about 0.5 mm.

EXAMPLES

Example 1

Concentrator System for Pilots

The performance of an oxygen concentrator system having to supply the pilots of an aeroplane has been shown in FIG. 1, which gives the oxygen concentration (purity) curves obtained as a function of the production output for adsorbents according to the invention (ADS 2 and ADS 3) and, as a comparison, for an adsorbent according to the prior art (ADS 1), i.e.:

$$O_2 \text{ concentration} = f(\text{production output}).$$

The operating conditions under which the measurements were carried out are the following:

system based on 2 adsorbers operating alternately;

adsorption pressure: 2 bar;

desorption pressure: 0.43 bar;

feed gas: air having an oxygen content of 21 vol %;

temperature of the feed gas: 20° C.;

cycle time: 2×2.9 s;

ADS 1: a zeolite according to the prior art of the NaX type, containing essentially Na cations (and possibly K cations), having a mean particle size of about 0.7 mm;

ADS 2: an Li-LSX-type zeolite exchanged to about 95% with Li cations (and having Na and possibly K cations for the remainder), having an Si/Al ratio of between 1 and 1.2 and a particle size of about 0.7 mm; and ADS 3: an Li-LSX zeolite identical to that of ADS 2, but having a particle size of about 1.5 mm.

The oxygen concentrator used had two adsorption columns filled with particles of the adsorbent in question. Oxygen was produced continuously, one column regenerating (desorption phase) when the other was in production (adsorption phase). The desorption also included a step called elution, and this corresponded to sending a small flow of $O_2$-enriched gas as a countercurrent into the column in regeneration phase so as to supplement the regeneration.

Figure 3:
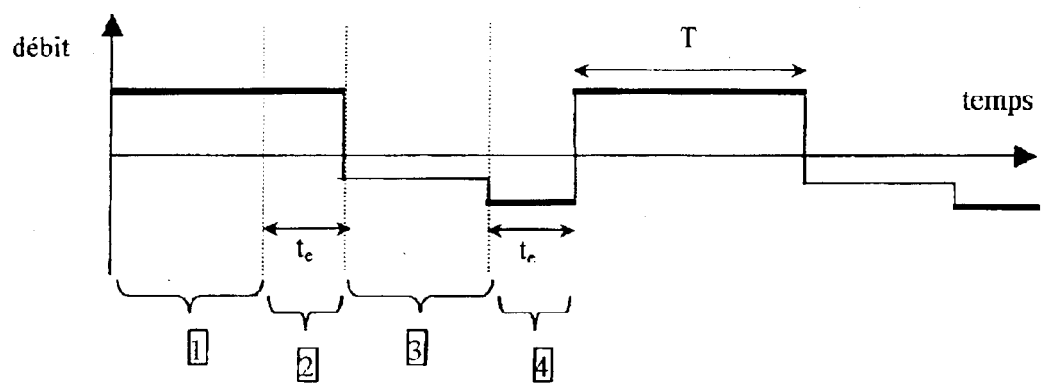
FIG. 3 represents a schematic drawing of the production output as a function of time for two adsorption columns with one column regenerating when the other column is in production.

In this way, the concentrator operated cyclically (2 phases) and each column experiences 4 different steps, as shown in FIG. 3, namely:

an adsorption phase, characterized by the half-cycle time T and comprising:
  a "pure" production step (Ref. 1 in FIG. 3)
  a production and elution phase for the other column (Ref. 2 in FIG. 3); and a regeneration phase with:
  a desorption (purge) step (Ref. 3 in FIG. 3)
  an elution step (elution time $t_e$) (Ref. 4 in FIG. 3).

The mean flow rate of gas in each adsorption column therefore changes as a function of time as represented in FIG. 3, which shows the average flow rate within each column as a function of time.

The elution step takes place at the end of the cycle, when the $O_2$ concentration of the gas output by the column is at a maximum. The elution period is typically between 10 and 50% of the half-cycle time, as may be seen in FIG. 3.

The superiority of the type of adsorbent of the invention (ADS 2 and ADS 3) compared with a standard adsorbent (ADS 1) is apparent in FIG. 1, given that this shows that, for a given output oxygen concentration, the output of oxygen produced is markedly greater than for a conventional adsorbent (ADS 1) and that, furthermore, for a given production output, the oxygen concentration produced in the output gas is markedly higher than that of a conventional adsorbent.

Moreover, there may also be a benefit in using adsorbent particles according to the invention of smaller diameter, since the 0.7 mm beads (ADS 2) result in a better performance than 1.5 mm beads (ADS 3), all other things being equal.

The expected weight saving for such an OBOGS system according to the invention for pilots is around 1 kg (10%) compared with a conventional adsorbent, all other things being equal.

Example 2

Concentrator System for Passengers

Figure 2:
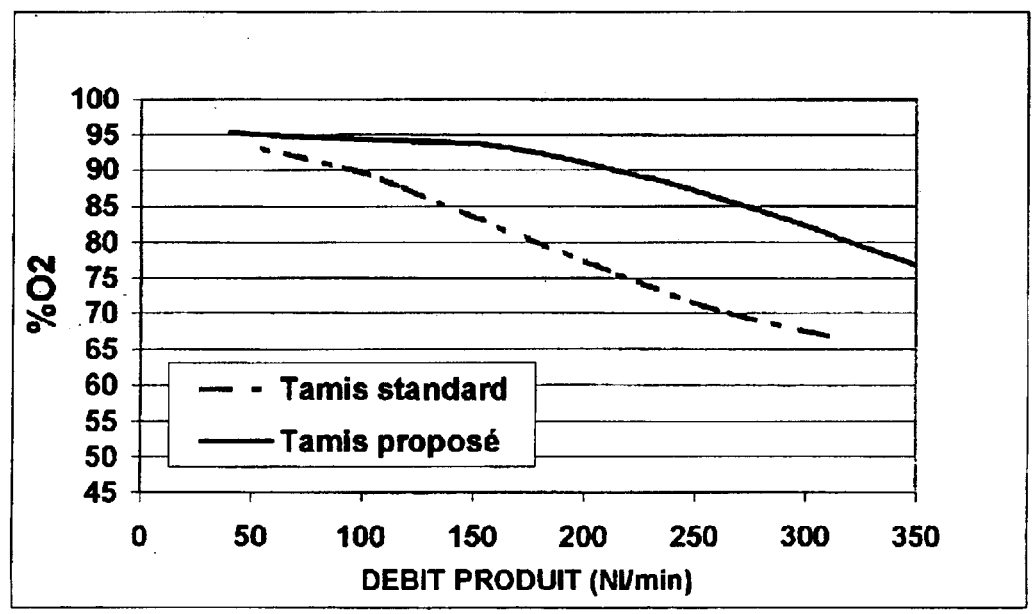
FIG. 2 is a graph illustrating the oxygen concentration (% purity) as a function of large-scale production output for one adsorbent of the invention and one adsorbent of the prior art.

The performance of an oxygen concentrator system having to supply the passengers of an aeroplane has been represented diagrammatically in FIG. 2, which shows the oxygen concentration (% purity) curves obtained as a function of the production output (in l/min) for an adsorbent according to the invention (proposed sieve) and, as a comparison, for an adsorbent according to the prior art (standard sieve), i.e.:

$$O_2 \text{ concentration} = f(\text{production output})$$

The operating conditions under which the measurements were carried out are the following:

system based on two adsorbers operating alternately;

adsorption pressure: 3 bar;

desorption pressure: 0.46 bar;

feed gas: air having an oxygen content of 21%;

temperature of the feed gas: 20° C.;

cycle time: 2×5 s;

adsorbent according to the invention: identical to ADS 2 of Example 1;

adsorbent according to the prior art: identical to ADS 1 of Example 1;

cycle: identical to that of Example 1 and FIG. 3.

In this case, the expected weight saving for a concentrator system, especially an OBOGS, for passengers is 60 kg (30%) with the adsorbent of the invention compared with a conventional adsorbent, all other things being equal.

It will be understood that many additional changes in the details, materials, steps and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A method for supplying the upper airways of at least one person in an aircraft with an oxygen-enriched gas stream, wherein producing said oxygen-enriched stream comprises:
  i) compressing an oxygen/nitrogen feed mixture to a pressure from about 0.5 to about 5 bar;
  ii) feeding at least some of the compressed oxygen/nitrogen mixture to at least one adsorber containing adsorbent particles;
  iii) adsorbing at least some of the nitrogen contained in said oxygen/nitrogen mixture on at least some of said adsorbent particles;

iv) producing an oxygen-enriched gas stream; and
v) conveying and controlling said oxygen-enriched gas stream directly to the upper airways of at least one person;

wherein said adsorbent comprises a faujasite-type zeolite, wherein the adsorbent comprises a faujasite-type zeolite exchanged with at least about 80% lithium cations, wherein said zeolite being in the form of bead particles having a mean size of less than about 0.7 mm, wherein the adsorber containing said adsorbent is subjected to production cycles with a cycle time of less than about 15 seconds, and wherein the output of produced oxygen-enriched gas is in the range of from about 20 and 500 L/min STPD per adsorber.

2. The method according to claim 1, wherein the faujasite-type zeolite comprises a Si/Al ratio from about 1 to about 1.50.

3. The method according to claim 1, wherein the oxygen-enriched stream comprises an oxygen content higher than the oxygen content of the oxygen/nitrogen feed mixture.

4. The method according to claim 1, wherein the oxygen-enriched stream comprises an oxygen volume content from about 30% to about 95% by volume.

5. The method according to claim 1, wherein the oxygen/nitrogen feed mixture contains substantially nitrogen.

6. The method according to claim 5, wherein the oxygen/nitrogen feed mixture is air.

7. The method according to claim 1, wherein it furthermore includes a step of regenerating the adsorbent by reducing the pressure in the adsorber down to a low pressure from about 0.09 to about 1 bar.

8. Method according to claim 7, wherein the low pressure is from about 0.1 to about 0.9 bar.

9. The method according to claim 1, wherein said at least one adsorber comprises two or three adsorbers operating per production cycle.

10. The method according to claim 1, wherein said faujasite-type adsorbent is an X-type zeolite.

11. The method according to claim 10, wherein said X-type zeolite comprises a Si/Al ratio from about 1 to about 1.25.

12. The method according to claim 11, wherein said Si/Al ratio is about 1.

13. The method according to claim 1, wherein said mean size of said bead particles is less than about 0.5 mm.

14. The method according to claim 1, wherein said faujasite-type zeolite is exchanged with lithium cations by about 85% to about 97%.

15. The method according to claim 14, wherein said faujasite-type zeolite is exchanged with lithium cations by about 86% to about 95%.

16. The method according to claim 1, wherein the oxygen-enriched gas produced is distributed to the upper airways of at least one pilot or to at least one passenger in the aircraft when the plane suffers depressurization of the passenger cabin.

17. The method according to claim 16, wherein said aircraft is a long-range, large-capacity type.

18. A system fitted on board an aircraft for the production of an oxygen-enriched gas stream from an oxygen/nitrogen gas mixture comprising at least one adsorber containing at least one adsorbent for adsorbing at least some of the nitrogen molecules contained in the oxygen/nitrogen feed mixture, wherein said adsorbent comprises a faujasite-type zeolite exchanged with lithium cations by at least about 80%, wherein said zeolite being in the form of bead particles having a mean size of less than about 0.7 mm, wherein the adsorber containing said adsorbent undergoes production cycles having a cycle time of less than about 15 seconds, and wherein the output of said produced oxygen-enriched gas is in the range of from about 20 and 500 L/min STPD per adsorber.

19. The system according to claim 18, wherein the faujasite-type zeolite comprises a Si/Al ratio from about 1 to about 1.50.

20. The system according to claim 18, wherein said at least one adsorber comprises at least two adsorbers operating alternately.

21. The system according to claim 20, wherein said system comprises:
i) compression means for compressing the gas mixture containing oxygen and nitrogen; and
ii) distribution means for ensuring that each adsorber is fed alternately with the compressed gas mixture delivered by said compression means.

22. The system according to claim 18, wherein the faujasite adsorbent comprises an X-type zeolite.

23. The system according to claim 22, wherein the X-type zeolite comprises a Si/Al ratio from about 1 to about 1.25.

24. The system according to claim 23, wherein the Si/Al ratio is about 1.

25. The system according to claim 18, wherein said mean size of said bead particles is less than about 0.5 mm.

26. The system according to claim 18, wherein said faujasite-type zeolite is exchanged with lithium cations by about 85% to about 97%.

27. The system according to claim 26, wherein said faujasite-type zeolite is exchanged with lithium cations by about 86% to about 95%.

28. The aircraft equipped with a system according to claim 18.

29. The aircraft equipped with a system according to claim 28, wherein the aircraft is an airliner.

30. The aircraft equipped with a system according to claim 29, wherein the airliner is a long-range, large-capacity type.

* * * * *